N. M. HOPKINS.
ELECTROMAGNETIC TACHOMETER.
APPLICATION FILED AUG. 1, 1912.

1,078,200.

Patented Nov. 11, 1913.

5 SHEETS—SHEET 1.

Witnesses:

Inventor:

N. M. HOPKINS.
ELECTROMAGNETIC TACHOMETER.
APPLICATION FILED AUG. 1, 1912.
1,078,200.
Patented Nov. 11, 1913.
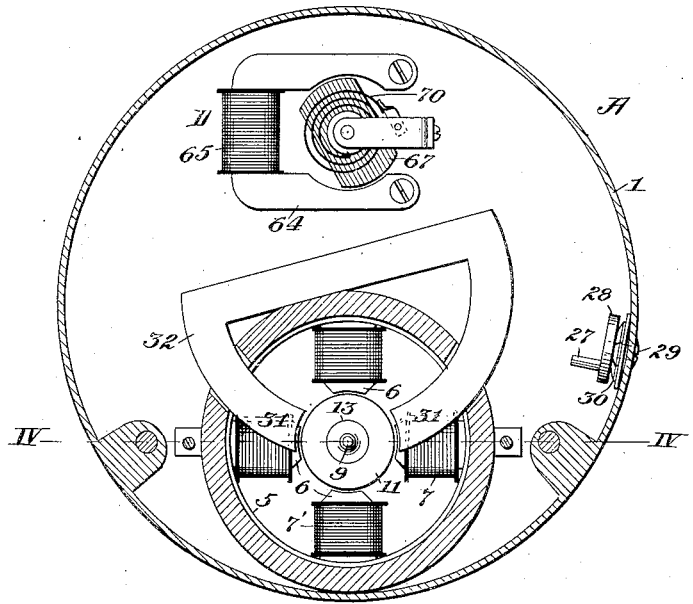
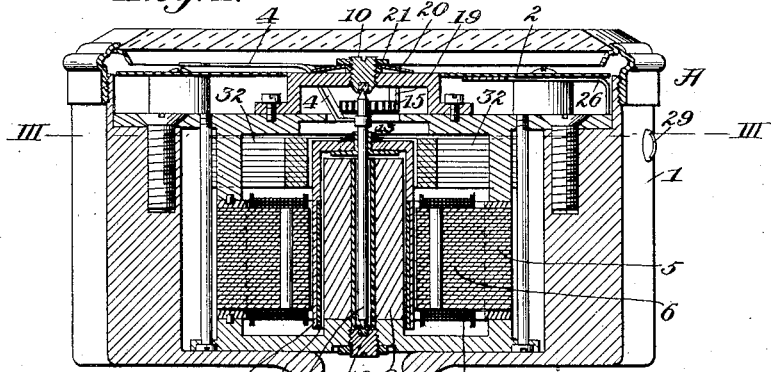
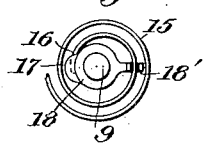
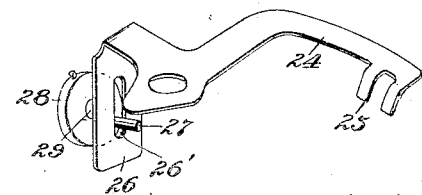
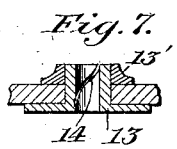

N. M. HOPKINS.
ELECTROMAGNETIC TACHOMETER.
APPLICATION FILED AUG. 1, 1912.
1,078,200.
Patented Nov. 11, 1913.
5 SHEETS—SHEET 3.
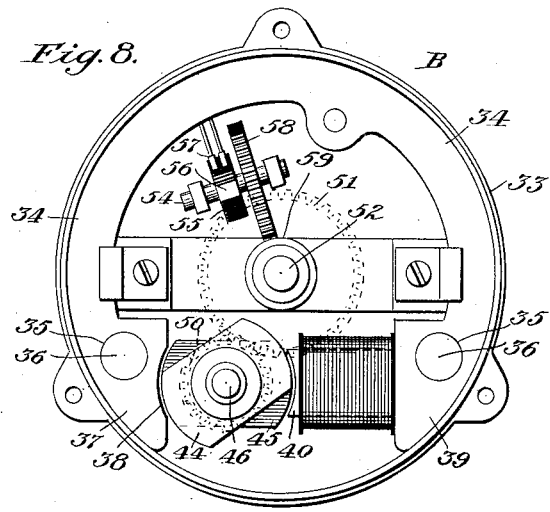
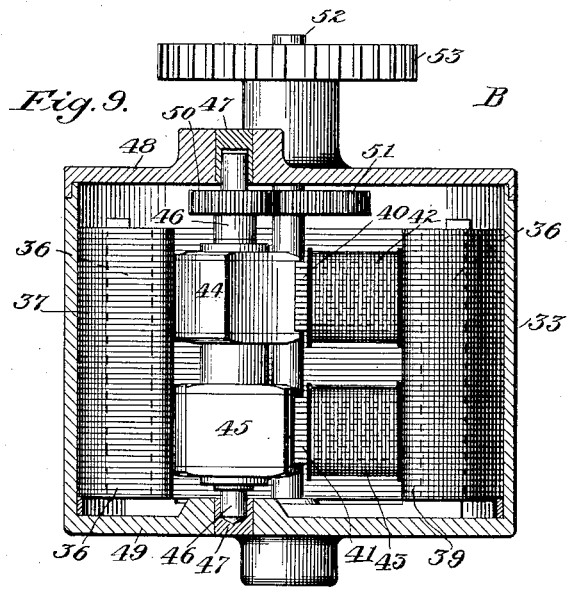

N. M. HOPKINS.
ELECTROMAGNETIC TACHOMETER.
APPLICATION FILED AUG. 1, 1912.
1,078,200.
Patented Nov. 11, 1913.
5 SHEETS—SHEET 4.
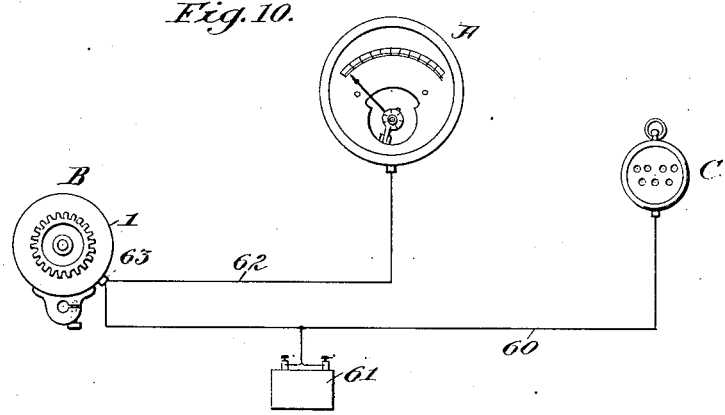
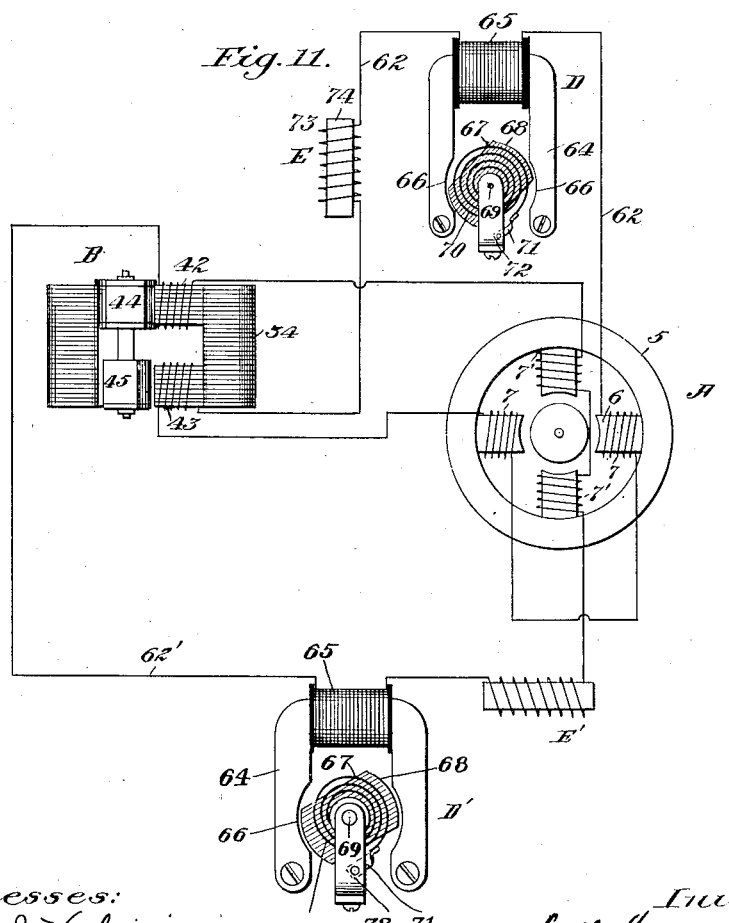

N. M. HOPKINS.
ELECTROMAGNETIC TACHOMETER.
APPLICATION FILED AUG. 1, 1912.
1,078,200.
Patented Nov. 11, 1913.
5 SHEETS—SHEET 5.
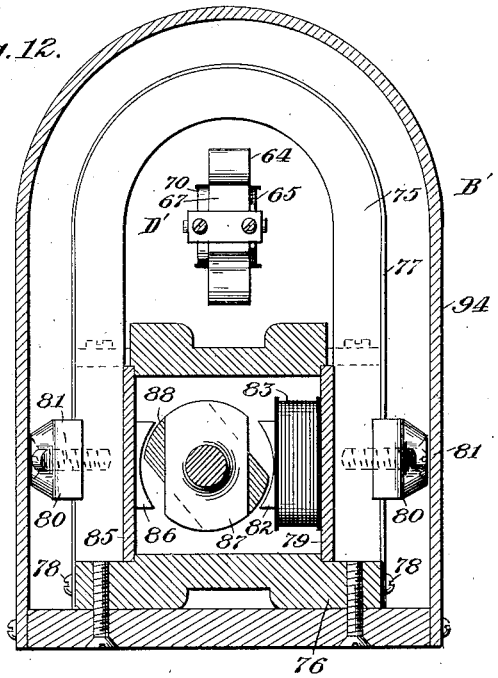
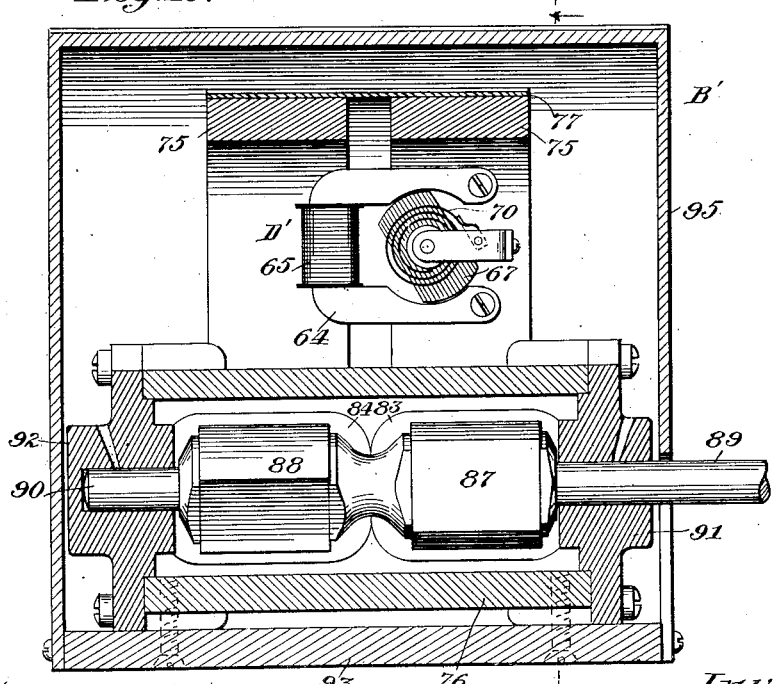

UNITED STATES PATENT OFFICE.

NEVIL MONROE HOPKINS, OF WASHINGTON, DISTRICT OF COLUMBIA, ASSIGNOR, BY MESNE ASSIGNMENTS, TO THE ELECTRIC TACHOMETER COMPANY, OF PHILADELPHIA, PENNSYLVANIA, A CORPORATION OF NEW JERSEY.

ELECTROMAGNETIC TACHOMETER.

1,078,200.  Specification of Letters Patent.  Patented Nov. 11, 1913.

Application filed August 1, 1912. Serial No. 712,732.

*To all whom it may concern:*

Be it known that I, NEVIL MONROE HOPKINS, a citizen of the United States, residing at Washington, in the District of Columbia, have invented certain new and useful Improvements in Electromagnetic Tachometers, of which the following is a specification.

This tachometer comprises an indicating instrument having an electromagnetic system providing a rotating electromagnetic field and an indicator member in inductive relation thereto, and a source of polyphase current driven by the wheel or shaft whose speed is to be measured.

Figure 1:
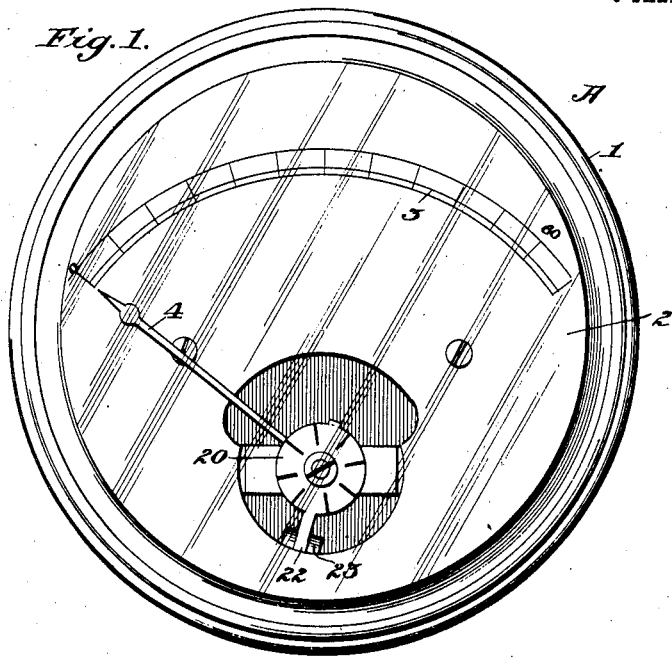
Figure 2:
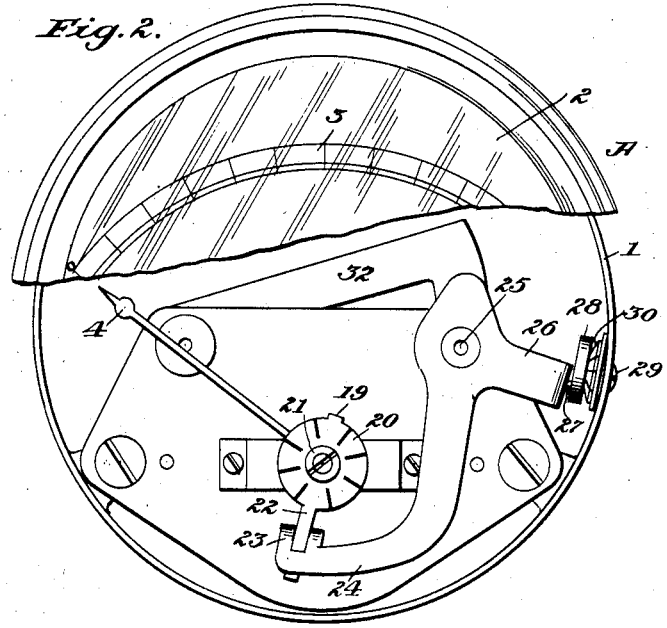

In the accompanying drawings,—Figure 1 is a plan view of the meter proper; Fig. 2 is a plan view of the meter, with a portion of its cover and dial broken away; Fig. 3 is a section of the meter, on the line III—III of Fig. 4; Fig. 4 is a sectional side elevation of the meter, on the line IV—IV of Fig. 3; Fig. 5 is a detail view of a meter-pointer adjusting-device; Fig. 6 is a detail view of a meter hairspring connection; Fig. 7 is a detail view of a meter rotor-ferrule; Fig. 8 is an end elevation of an automobile type of magneto generator, with the driving-pinion and one end-plate removed; Fig. 9 is a side elevation of this generator, its case being shown in vertical section; Fig. 10 is a diagrammatic view of an automobile tachometer with a battery-energized odometer; Fig. 11 is a wiring diagram of a tachometer, showing automatic and non-automatic reactances for temperature-compensation and for calibration; Fig. 12 is a vertical transverse section of an engine-room type of magneto generator, on the line XII—XII of Fig. 13; and Fig. 13 is a vertical axial section of this generator.

The indicating instrument, or meter proper, A, illustrated in Figs. 1 to 7, comprises a cylindrical water- and dust-proof case 1, having a dial 2 with a speed-scale 3, over which plays a pointer 4. The meter has an electromagnetic system consisting of a series of superposed rings 5 of soft sheet-iron, from which extend radially inward four integral pole-pieces 6. Each pole-piece carries a winding 7, and the four windings are connected to receive two-phase current from a magneto generator. Fixed within and adjacent to the pole-pieces is a cylindrical soft-iron core or armature 8, having a central passage which receives a spindle 9, journaled at its ends in jeweled bearings 10. The rotor 11, an inverted cup of aluminum having a soft-iron lining 12, is concentrically secured on shaft 9 by a two-part ferrule 13, 13′, shown in detail in Fig. 7. This ferrule has an internal spiral groove 14, and is soldered to the rotor 11 and spindle 9, the solder flowing downward into the groove 14. The rotor and its pointer 4 are held in the zero position by a hairspring 15, the inner end 16 of which is secured by solder 17 to a clip 18 fixed on the spindle 9, as illustrated in Fig. 6. Clip 18 has a fork 18′ which receives and closely fits the hairspring, at a point some distance from its soldered end 16, where the elasticity has not been impaired by the heat used in applying the solder. The other end of spring 15 is secured to a lug 19 depending from a thin concave radially-slotted centrally-apertured spring-disk 20. This disk is revolubly mounted on and is held under slight tension by a flanged nut 21 threaded on the upper pivot-jewel screw 10. Disk 20 has an arm 22 which engages a depending fork on the end of a bell-crank lever 24 mounted on a pivot 25. The other arm 26 of this lever is bent downward and has a vertical slot 26′, shown in Fig. 5, which receives a pin 27 projecting from a revoluble disk 28 carried by a pivot 29 journaled in the side-wall of the meter-case 1. The outer end of this pivot is slotted to receive a screw-driver. A spring-washer 30 is interposed between the disk 28 and the case, offering frictional resistance to the rotation of the disk. By turning the disk 28, the position of the lever 24 and thereby of the adjusting-disk 20 and outer end of the hairspring 15 may be adjusted, to set the pointer 4 accurately at zero on scale 3.

When two-phase current is supplied to the windings 7 and 7′ of the electromagnet, the rotating electromagnetic field thereby produced turns the rotor 11 and pointer 4 through an arc dependent on the strength and frequency of the current flowing. The variable torque of the rotor, opposed by that of the hairspring 15, is the sum of two factors. One of these factors is due to the electric currents induced in the depending wall of the aluminum cup 11, reacting on the magnetic fluxes bridging the gap between the pole-pieces 6 and iron core 8. The arc of rotation due to this factor does not vary directly as the current flowing in the winding 7, and the scale-divisions of a meter having a rotor of aluminum only, would be very short at the lower end of the scale and would greatly increase in length at the upper end of the scale. The other factor causing rotation in the present meter is the direct pull of the rotating electromagnetic field on the iron lining 12 of the rotor. By properly dimensioning the aluminum and iron portions of the rotor, a speed-scale having quite uniform divisions may be employed. At opposite sides of and in close proximity to the upper end of the rotor are arranged the pole-pieces 31 of a laminated permanent magnet 32. This magnet has two functions: It acts to damp, or prevent sudden and irregular movements of the rotor, by the action of the currents thereby induced in the rotor; and, by its pull on the iron lining 12 of the rotor, it greatly decreases the pressure on the lower pivot-bearing 10, and thereby the friction at this point.

The automobile magneto-generator B, illustrated in Figs. 8 and 9, comprises a cylindrical water- and dust-proof case 33, within and closely fitting the side walls of which is a circular laminated permanent magnet 34. The opposite ends of this magnet have large cylindrical passages 35, which receive closely-fitting soft-iron rivets 36. The end 37 of the magnet constitutes one pole-piece, and has a vertical arc-shaped recess 38. The other end 39 of the magnet has two superposed projecting concave-faced pole-pieces 40, 41, provided by integral extensions of the corresponding laminæ. Pole-piece 40 carries a winding 42 and pole-piece 41 carries a winding 43. The rotor of this generator consists of two unalined superposed inductors 44, 45, of soft iron, rigidly mounted at a mutual angle of 45° on a central shaft 46, which is journaled at its ends in bushings 47 seated in the upper and lower end-plates 48, 49 of the generator casing. This shaft, being small, but slightly decreases the magnetic permeability of the inductors. Shaft 46 carries at its upper end a fine-toothed gear 50, which meshes with a gear 51 fixed on a larger shaft 52 centrally journaled in and extending through the end-plate 48. Shaft 52 carries an external coarse-toothed pinion 53, adapted to engage a gear-wheel mounted on the wheel of an automobile. When the inductors 44, 45 are set in rotation, two-phase current, or two alternating currents out of phase with each other by an angle of 90° electrically, are induced in the windings 42, 43, and these currents are transmitted to the windings of the meter electromagnet. The reading on the speed-scale of the meter is directly proportional to the speed of rotation of the driven shaft 52 and inductors 44, 45, and the scale may be calibrated in any desired units. When one of the two revolving inductors, as illustrated the lower one 45, is momentarily in position to fully short-circuit the magnetic flux between the magnet pole-piece 37 and the lower wound pole-piece 41, the soft-iron rivets 36 transmit the flux from the upper laminæ of the magnet, where the magnetic circuit is then partially interrupted by the disalinement of inductor 44, down to the lower laminæ, so that the full power of the magnet is utilized to saturate the pole-piece 41 and thereby increase the strength of the currents generated in the winding 43. As the inductors rotate further, bringing the upper one 44 in alinement with the upper gap, the rivets 36 similarly transmit the flux from the lower laminæ to the upper ones.

Within the generator-case 33 is a contact-maker for closing the circuit of an electromagnetic odometer. This device comprises a shaft 54, journaled in suitable bearings, on which is fixed a disk 55 of insulating material, carrying a metal plate 56. Two fixed brushes 57 are arranged to bear on plate 56 as it rotates beneath them, thereby closing the odometer circuit, otherwise interrupted at this point. Shaft 54 is driven by a gear-wheel 58, meshing with a worm 59 on the driving-shaft 52.

Fig. 10 diagrammatically illustrates an electromagnetic odometer C, connected to the contact-maker B by a circuit 60 including a battery 61 as a source of current. The meter A is shown connected to the generator B by an independent circuit 62, the wires of both the meter and odometer entering the generator-case 1 through a common water- and dust-proof passage 63.

As the currents produced by the magneto-generator B are comparatively small, the windings of this generator and of the meter, as well as the circuit wires, should be of metal of the highest conductivity, that is, of pure copper, and the meter-rotor cup 11 should be of pure aluminum. The temperature-coefficient of resistivity of copper and aluminum is, however, large, necessitating the provision of means for compensating for the changes of atmospheric temperature. As such means, a variable reactance-coil or coils are interposed in the circuits. Their reactance may be varied either manually or by automatic means.

Fig. 11 illustrates both automatic reactances D and D' and non-automatic reactances E and E' in each of the two phase circuits connecting the windings of the meter A and the generator B. The automatic compensator D comprises a U-shaped soft-iron core 64 carrying the reactance coil 65. The ends of the core 64 have arc-shaped recesses 66, and a soft iron flux-carrier 67 having flat sides and convex ends 68, is mounted on pivots 69, between and with its ends in close proximity to the concave ends of the core. A spirally-coiled bi-metallic strip 70 constitutes the thermostat, or temperature-responsive element, its inner end being attached to the flux-carrier 67 or to its shaft, and its outer end 71 being fixed to the arm 72 receiving the upper pivot 69. The coiled strip 70, unwinding or rewinding as the temperature of the atmosphere about it changes, shifts the position of the flux-carrier 67 and correspondingly varies the reactance of coil 65. As the temperature falls and thereby increases the conductivity of the copper circuit-wires 62, meter-windings 7 and generator-winding 43 of one phase, and that of the aluminum rotor, the thermostat acts to increase the reactance of coil 65, and reversely, decreases its reactance as the temperature rises. A non-automatic compensator, comprising a reactance coil 73 and a manually-adjustable core 74 is also interposed in circuit 62, serving for the initial calibration of the meter, being set to interpose such reactance as to compensate at the temperature of calibration. Similar automatic and non-automatic reactance compensators D', E' are interposed in the circuit 62' connecting the meter-winding 7' and generator-winding 42 of the other phase.

The engine-room type of magneto generator illustrated in Figs. 12, 13 comprises two heavy horseshoe magnets 75, arranged side by side but spaced apart. The ends of these magnets are seated in rabbets in the base-plate 76. A sheath 77 of spring-brass surrounds and clamps the magnets, its ends being secured to the base-plate by screws 78. A rectangular soft-iron plate 79 is clamped against the inner faces of the corresponding polar extremities of the magnets, by a bar 80 bearing against their outer faces and having a screw 81 which enters a projection on plate 79, intermediate the magnets. Plate 79 has two integral rectangular soft-iron extensions, with concave faces, serving as pole-pieces. One of these extensions, 82, has a winding 83, and the other has a winding 84. A rectangular soft-iron plate 85 is similarly clamped against the inner faces of the opposite polar extremities of the magnets, and has a single long unwound extension and pole-piece 86. Revolubly mounted between the two wound and the unwound pole-pieces are two rigidly-connected soft-iron inductors 87, 88, having trunnions 89, 90 which are journaled in end-plates 91, 92. When these rotors are driven by the shaft whose speed is to be measured, two-phase current is generated in the windings 83, 84 and transmitted to the meter A heretofore described. The soft-iron plates 79, 85 act, like the soft-iron rivets 36 in the automobile type of generator, to transmit the lines of force of both magnets through the particular inductor 87 or 88 which is momentarily bridging the space between the pole-pieces. To shield the magnets 75 from external magnetic influences, the generator is inclosed in a soft-iron case, comprising a bottom 93, sides 94 and ends 95. An automatic temperature-compensator D', of the construction heretofore described, is mounted in the generator case. Where, as on battleships, the meter and generator are located at different points which may be at widely different temperatures, the meter for example being on the bridge while the generator is in the engine-room, it is preferable to employ two automatic compensators D, D', one in the meter-case, as shown in Fig. 3, and the other in the generator case. One of these compensators may be placed in each phase circuit, as shown in Fig. 11. In the two-phase automobile tachometer, it is sufficient to provide an automatic compensator in one phase circuit and a non-automatic calibrating compensator in the other phase circuit. The reactance coils not only serve as temperature-compensators, but also assist in maintaining a uniform ratio between the generator-speed and meter-rotor torque, the reactance increasing with the speed, frequency and generated electromotive force, thereby conducing to uniformity of scale-divisions.

One or the other of the two inductors 44, 45, or 87, 88, of both types of generator, at all times acts as a magnetic bridge or armature for all of the assembled magnets, the combined flux of which is carried by soft-iron rivets 36 or plates 79, whereby the retention of their magnetism is insured.

The multiplying gears 50, 51 drive the inductors 44, 45 at a higher speed than that of the shaft 52. Such high inductor-speed is important, giving currents of high frequency, thereby improving the reading on the lower part of the meter-scale.

The inductors being journaled in internal dust-proof bearings, which are little subject to wear, may be of such size as to nearly fill the gap between the magnet-poles, thereby giving a magnetic circuit of low resistance.

The expression "continuous and permanent circuits," used in certain claims, is intended to distinguish from circuits including slip-rings with brushes bearing thereon, which introduce an objectionable and variable resistance, impairing the accuracy of the readings.

Structural features of the meter and generator shown herein are claimed in my application Serial No. 743,685, filed January 22, 1913, and in my Patent No. 1,055,911, patented March 11, 1913.

I claim:

1. In a tachometer consisting of an indicator member, a speed-scale having comparatively uniform divisions, a winding or windings adapted to receive electric current and actuate said indicator member, and means for supplying alternating current to said winding or windings, including a member driven by the wheel or shaft whose speed is to be measured: a reactance in the tachometer circuit, adjusted to maintain a uniform ratio between the speed of said wheel or shaft and the torque impressed on said indicator member.

2. In a tachometer consisting of an indicator member, a winding or windings adapted to receive electric current and actuate said indicator member, and means for supplying alternating electric current to said winding or windings, including a member driven by the wheel or shaft whose speed is to be measured: an adjustable reactance in the tachometer circuit, adapted to compensate temperature-changes of resistance therein, without varying the ohmic circuit-resistance.

3. In a tachometer consisting of an indicator member, a winding or windings adapted to receive electric current and actuate said indicator member, and means for supplying alternating electric current to said winding or windings, including a member driven by the wheel or shaft whose speed is to be measured: an adjustable reactance in the tachometer circuit, and a thermostat controlling said reactance.

4. In a tachometer consisting of an indicator member, a winding or windings adapted to receive electric current and actuate said indicator member, and means for supplying alternating electric current to said winding or windings, including a member driven by the wheel or shaft whose speed is to be measured: a plurality of adjustable reactances in the tachometer circuit or circuits, at points subject to different temperature-conditions, adapted to compensate temperature-changes of resistance without varying the ohmic circuit-resistance.

5. In a tachometer consisting of an indicator member, a winding or windings adapted to receive electric current and actuate said indicator member, and means for supplying alternating electric current to said winding or windings, including a member driven by the wheel or shaft whose speed is to be measured: a plurality of adjustable reactances in the tachometer circuit or circuits, and a thermostat controlling one of said reactances.

6. In a tachometer consisting of an alternating-current meter and generator and connecting leads: a plurality of thermostatically-controlled reactances in the tachometer circuits, one of said reactances being adjacent to said meter and the other to said generator.

7. In a tachometer consisting of a polyphase meter and generator and connecting leads: an adjustable reactance in each phase circuit of said tachometer, adapted to compensate temperature-changes of resistance therein without varying the ohmic circuit-resistance.

8. In a tachometer consisting of a polyphase meter and generator and connecting leads: a thermostatically-controlled reactance in each phase circuit of said tachometer.

9. A tachometer consisting of an alternating-current generator and meter and connecting leads, said generator comprising a permanent field-magnet with a wound pole-piece and an inductor member, and said meter comprising field-coils and an indicator member, the windings of said generator and meter and said leads constituting continuous and permanent circuits.

10. A tachometer consisting of a polyphase generator and meter and connecting leads, said generator comprising a permanent field-magnet with wound pole-pieces and inductors respectively opposed to said pole-pieces, and said meter comprising field-coils and an indicator rotor, the windings of said generator and meter and said leads constituting continuous and permanent circuits.

11. A tachometer consisting of a polyphase generator and meter and connecting leads, said generator comprising a permanent field-magnet with wound pole-pieces and non-parallel inductors respectively opposed to said pole-pieces, and said meter comprising field-coils, a hollow indicator rotor, and a soft-iron core within said rotor, the windings of said generator and meter and said leads constituting continuous and permanent circuits.

12. A tachometer consisting of a polyphase generator and meter and connecting leads, said generator comprising a permanent field-magnet with superposed parallel wound pole-pieces, and superposed inductors relatively offset at an angle of 45°, respectively opposed to said pole-pieces, and said meter comprising an electromagnet wound to provide poles spaced apart 90°, and an indicator rotor, the windings of said generator and meter and said leads constituting continuous and permanent circuits.

13. A tachometer consisting of an alternating-current generator and meter and connecting leads, said generator comprising a water- and dust-proof case, a wound permanent magnet, a revoluble inductor member, a driving-shaft extending through said case, and multiplying gears within said case, connecting said shaft and inductor member, whereby the inductor-speed is such as to give currents of comparatively high voltage and frequency, said meter having a comparatively uniformly-divided scale.

14. A tachometer consisting of an alternating-current generator and meter and connecting leads, said generator comprising a water- and dust-proof case, a wound permanent magnet, a revoluble inductor member, a driving-shaft extending through said case, and multiplying gears within said case, connecting said shaft and inductor member, whereby the inductor-speed is such as to give currents of comparatively high voltage and frequency, said meter having a comparatively uniformly-divided scale, and a reactance in the tachometer circuit, adjusted to contribute to the uniformity of the meter-scale divisions.

15. A tachometer consisting of an alternating-current generator and meter and connecting leads, the windings of said meter and generator and said leads constituting continuous and permanent circuits, said generator comprising a water- and dust-proof case, a wound permanent magnet, a revoluble inductor member, a driving-shaft extending through said case, and multiplying gears within said case, connecting said shaft and inductor member, whereby the inductor-speed is such as to give currents of comparatively high voltage and frequency, and said meter having a comparatively uniformly-divided scale.

In testimony whereof I affix my signature in presence of two witnesses.

NEVIL MONROE HOPKINS.

Witnesses:
JAMES E. HOLLYDAY,
EUGENE A. BYRNES.